(12) United States Patent
Fu et al.

(10) Patent No.: US 10,328,494 B2
(45) Date of Patent: Jun. 25, 2019

(54) SOLID-LUBRICATED METAL CUTTER AND PROCESSING METHOD THEREOF

(71) Applicant: Jiangsu University, Jiangsu (CN)

(72) Inventors: Yonghong Fu, Jiangsu (CN); Zhengyang Kang, Jiangsu (CN); Guowen Zou, Jiangsu (CN); Hao Wang, Jiangsu (CN); Xijun Hua, Jiangsu (CN); Jinghu Ji, Jiangsu (CN); Feng Zheng, Jiangsu (CN); Hao Fu, Jiangsu (CN)

(73) Assignee: Jiangsu University, Jiangsu (CN)

( * ) Notice: Subject to any disclaimer, the term of this patent is extended or adjusted under 35 U.S.C. 154(b) by 41 days.

(21) Appl. No.: 15/736,447

(22) PCT Filed: Aug. 9, 2016

(86) PCT No.: PCT/CN2016/094102
§ 371 (c)(1),
(2) Date: Dec. 14, 2017

(87) PCT Pub. No.: WO2018/000529
PCT Pub. Date: Jan. 4, 2018

(65) Prior Publication Data
US 2019/0061010 A1 Feb. 28, 2019

(30) Foreign Application Priority Data

Jul. 1, 2016 (CN) .......................... 2016 1 0508122

(51) Int. Cl.
*B23B 27/14* (2006.01)
*B23P 15/28* (2006.01)
(Continued)

(52) U.S. Cl.
CPC ............ *B23B 27/14* (2013.01); *B23K 26/355* (2018.08); *B23K 26/36* (2013.01); *B23P 15/28* (2013.01);
(Continued)

(58) Field of Classification Search
CPC ........... Y10T 428/24182; Y10T 407/24; Y10T 407/245; B23B 27/06; B23B 27/14;
(Continued)

(56) References Cited

U.S. PATENT DOCUMENTS 4,854,785 A 8/1989 Lowe et al.

FOREIGN PATENT DOCUMENTS

CN 101125371 A 9/2007
CN 102000841 A 9/2010
(Continued)

*Primary Examiner* — Alexander S Thomas
(74) *Attorney, Agent, or Firm* — Greenberg Traurig, LLP

(57) ABSTRACT

A solid-lubricated metal cutter and processing method relates to the technical field of metal cutters. A surface texture morphology is worked out on a metal cutter, a solid lubricant is filled into the surface texture morphology, and a convex dam is arranged on the cutter surface on which surface texture morphology is located at a chip flow side. The surface texture morphology has micro-pit and micro-boss features, and can exert antifriction effect of a solid lubricant and anti-adhesion effect of micro-protrusions. The convex dam is arranged at an end of the micro-texture region away from the cutting blade, so that a part of the solid lubricant flows back to the texture region and thereby the utilization efficiency and retentiveness of the solid lubricant are improved.

23 Claims, 3 Drawing Sheets

(51) Int. Cl.
  *B23K 26/352* (2014.01)
  *B23K 26/36* (2014.01)
  *B23K 101/20* (2006.01)
(52) U.S. Cl.
  CPC ..... *B23B 2200/081* (2013.01); *B23B 2222/04* (2013.01); *B23B 2222/88* (2013.01); *B23B 2228/52* (2013.01); *B23B 2260/092* (2013.01); *B23K 2101/20* (2018.08); *Y10T 428/24182* (2015.01)
(58) Field of Classification Search
  CPC .......... B23B 2200/081; B23B 2228/52; B23B 2222/88; B23B 2222/04; B23P 15/28; B23K 26/355; B23K 26/36
  See application file for complete search history.

(56) References Cited

FOREIGN PATENT DOCUMENTS

| | | |
|---|---|---|
| CN | 102189287 A | 4/2011 |
| CN | 102962656 A | 11/2012 |
| CN | 103111819 A | 1/2013 |
| CN | 105149894 A | 10/2015 |

SOLID-LUBRICATED METAL CUTTER AND PROCESSING METHOD THEREOF

CROSS REFERENCE TO RELATED APPLICATION

This application is a non-provisional application claiming priority from International Application No. PCT/CN2016/094102, filed Aug. 9, 2016, which claims priority to Chinese Patent Application No. 201610508122.0, filed Jul. 1, 2016, each of which are incorporated herein by reference in their entirety.

TECHNICAL FIELD

The present invention relates to the technical field of metal cutters, in particular to a process of working out a surface texture morphology on a metal cutter and then filling a solid lubricating material into the surface texture morphology to improve cutting performance.

BACKGROUND OF RELATED ART

In a metal cutting process, cutting heat is accumulated near the nose of tool and results in sharp increase of local temperature on the cutter; as the chips flow out at high speed, the rake face and flank face of the cutter may be worn out easily, and consequently so-called "crescent depression" is formed thereon. As the width and depth of the "crescent depression" increase and extend towards the cutting edge gradually, the strength of the cutting blade is decreased, resulting in breaking of the blade. Besides, in the cutting process of a highly plastic metal material, built-up edges are formed owing to a "sticking phenomenon", affecting surface quality and dimensional accuracy of the workpiece. Therefore, the surface wearing and adhesion of a cutter have a direct influence on the cutting quality and service life of the cutter.

From the view of bionic, micro-bulge morphologies can endow some unique properties to surfaces. For example, the sub-micron mastoids on the surface of a lotus leaf bestow a super-hydrophobic property to the lotus leaf; the lumpy protrusions on the skin surface of shark are helpful for decreasing submarine resistance. Actually, the anti-adhesion effect of micro-bulges may also be applied to the interface of the cutter-chip friction pair; a morphology of micro-bulge array can reduce the actual area of contact therebetween and exert debonding and antifriction effects. For example, the Chinese patent ZL201210446252.8 has disclosed a method and an apparatus for complex texturing treatment of cutter surface. Micro-cavities, fused protrusions, and micro-grooves are worked out on the cutter at main frictional and wear portions by means of a high-energy laser beam or high-energy electronic beam to prolong the service life of the cutter, improve cutting quality and cooling effect, and reduce machining cost. In addition, the patent document has further disclosed a processing apparatus that implements the complex texturing treatment method. The method can reduce cutter-chip adhesion to a certain extent, but attains very limited effects of reducing the cutting force, cutting temperature rise, and wearing, etc.; under some cutting conditions, the chips are in point-contact with the point-shaped protrusions and cause increased friction; in addition, the micro-bulges may be worn down easily, and have poor morphology retentiveness.

The Chinese patent ZL201110089826.6 has disclosed a micro-textured self-lubricating drill bit and a method for preparing the drill bit, wherein, a micro-groove or micro-pore texture is arranged in the cutter-chip contact region of a rake face, and filled with solid emulsifier. During dry cutting, under the effect of high temperature, the solid lubricant in the micro-texture is softened quickly and coated over the rake face of the cutter, forming a continuous solid lubrication layer, which can prevent adhesion, reduce friction and abrasion, and improve the service life of the cutter. In that patent, a lubricant is filled in a concave texture morphology, which has poor anti-adhesion performance when compared with a protrusion texture; moreover, the volume of solid lubricant that can be stored in the pit morphology is very limited, consequently, the effective lubrication time is limited to a certain extent.

The Chinese patent ZL201310022645.0 has disclosed a preparing method for an anti-adhesion, antifriction, and micro-mosaic complex texture on cutter surface, wherein, a complex texture that has textured micro-bulges, micro-cavities, and micro-grooves is formed on the cutter surface by means of laser; and a composite solid lubricant material is packed into the micro-cavities and micro-grooves under pressure. The method is inconvenient to implement, because it involves complex morphologies and has strict requirements for the laser; in addition, the method has problems, for example, the micro-bulges on the surface may be worn down easily, and the solid lubricant is consumed quickly.

The Chinese patent CN201510653803 has disclosed a preparing method for a micro-textured cemented carbide blade, wherein, a forming mold with a micro-texture is prepared with a cubic boron nitride grinding wheel, then cemented carbide powder is pressed in the forming mold, and a micro-textured cemented carbide cutter is prepared by vacuum sintering. The method requires a complex process, and is difficult to implement; in addition, since the micro-texture morphology can't be too small in size owing to the requirements of the compression molding and mold stripping process, the micro-texture obtained with the method is large in size and has poor anti-adhesion and lubrication effects.

SUMMARY

The technical problem to be solved in the present invention is: the lubrication at the cutter-chip contact interface is insufficient and may cause a sticking phenomenon under a cutting condition of drying cutting and minimal quantity of lubricant; with the existing solid lubricant technique for a complex texture on cutter surface in the prior art, the solid lubricant is consumed very quickly, and no obvious anti-adhesion effect is obtained for the cutter.

In the present invention, for a dry cutting condition, a laser machining method is employed to work out on cutter surface a concave-convex complex morphology texture, which is then filled with solid lubricant. The concave-convex complex morphology has micro-pit and micro-boss features, and can exert antifriction effect of a solid lubricant and anti-adhesion effect of micro-protrusions. A convex dam is arranged at an end of the micro-texture region away from the cutting blade, so that a part of the solid lubricant flows back to the texture region and thereby the utilization efficiency of the solid lubricant is improved.

The technical scheme of the present invention is as follows: an array of concave-convex complex morphologies, each of which is slightly convex on the periphery and slightly concave at the center, is worked out on the rake face or flank face of a cutter, and then a solid lubricant is filled into pits in the morphology and is cured, to form a special surface with concave-convex complex textures combined with the solid lubricant; in the cutting process, the solid lubricant is released continuously from the concave-convex complex morphology and is transferred by the chips that flow out at a high speed, so that a solid lubricant film is formed at the cutter-chip contact interface; a convex dam is arranged at a chip flow side (i.e., away from the cutting blade) of the array of concave-convex complex texture, to block the solid lubricant powder from flowing out and force the solid lubricant powder to circulate. A convex dam is also arranged on the cutter surface in a direction perpendicular to the chip outflow direction; the convex dam blocks the solid lubricant powder from further scattering to the distal end of the cutter tip in the cutting process, and forces the solid lubricant to flow back to the region of the concave-convex complex texture, so that the solid lubricant is subjected to cyclic utilization.

In the present invention, a surface texture morphology is worked out on the metal cutter, a solid lubricant is filled into the surface texture morphology, and a convex dam is arranged on the cutter surface on which the surface texture morphology is located at the chip flow side. The surface texture morphology is a concave-convex complex morphology, which is an array with pits arranged at the center and annular bosses arranged around the pits. Wherein, the diameter of the pit is 50-500 μm, and the depth of the pit is 10-100 μm. The height of the annular bosses is 1-30 μm, and the width of the annular bosses is 5-100 μm. The surface texture morphology is at 50-200 μm distance from the cutting blade.

The solid lubricant is filled into the cutter surface with the concave-convex complex texture to a filling height that the solid lubricant is flush with the top of the annular bosses.

The convex dam is a band-shaped protrusion, has a height of 50-500 μm and a width of 100-1,000 μm. The convex dam is perpendicular to the chip outflow direction. The number of the convex dams is greater than or equal to 1; in case of two or more convex dams, the convex dams are arranged parallel to each other.

The surface texture morphology region at least comprises a region where the cutter is in contact with chips and a region where the cutter is in contact with a workpiece.

The area percentage of the surface texture morphology is 10%-40%. In case that the processing workpiece of the cutter is an aluminum alloy workpiece, the area percentage of the surface texture morphology is 15%-25%. In case that the processing workpiece of the cutter is a titanium alloy workpiece, the area percentage of the surface texture morphology is 35%-45%.

The solid lubricant is a composite material composed of one or two of molybdenum disulfide, graphite, tetraboron nitride or silver solid lubricants.

The method provided in the present invention comprises: first, working out a surface texture on the metal cutter; then, working out a convex dam on the cutter surface on which the surface texture morphology is located at a chip flow side; next, filling a solid lubricant into the surface texture morphology; finally, fixing the solid lubricant in the microtexture morphology by sintering. The curing temperature in the sintering process is 200-600° C., and the curing time is 10-60 minutes.

The surface texture morphology is processed by means of a laser beam to obtain a concave-convex complex morphology and a convex dam morphology; the laser is a $CO_2$ laser, lamp pumping YAG laser, diode pumping YAG laser, or optical fiber laser; the parameters of the laser include: 40-1,000 W output power, ±2 mm defocusing amount, and 0.01-500 ms pulse width. The method for processing the concave-convex complex morphology comprises: processing the cutter surface with a single laser pulse to obtain a morphology that has a pit at the center and an annular boss around the pit, changing the irradiation position of the laser on the cutter surface to an adjacent morphology point and then processing with a single laser pulse in the same way, and repeating the operations to work out an array of concave-convex complex morphologies. The convex dam is formed by continuous laser beam scanning.

The method for filling solid lubricant into the surface texture morphology comprises: filling the solid lubricant into the pits of the concave-convex complex morphology, till the final filling height of the solid lubricant is equal to the height of the annular bosses.

Alternatively, the method for filling solid lubricant into the surface texture morphology comprises: filling the solid lubricant into the pits of the concave-convex complex morphology till the final filling height of the solid lubricant is greater than the height of the annular bosses, and filling the space outside of the pits of the concave-convex complex morphology so that the solid lubricant covers all morphology features in the texture region; and then leveling the filled surface with a piece of abrasive paper, and removing partial solid lubricant, till the thickness of the solid lubricant is equal to the height of the annular bosses.

After the sintering process, excessive solid lubricant on the surface is removed by sanding with a piece of abrasive paper, till the height of the solid lubricant is equal to the height of the annular bosses.

The area percentage of the concave-convex complex texture is a ratio of the area enclosed by the boundaries of the concave-convex complex morphology to the area of the texture region.

The diameter of the pit is the diameter of the maximum inscribed circle of a shape enclosed by the boundaries of the pit.

The depth of the pit is the distance from the deepest point of the pit morphology to the surface of the base material.

The height of the annular boss is the distance from the highest point of the annular boss to the surface of the base material.

The width of the annular boss is the average of radial thickness of the annular boss.

The present invention attains the following beneficial effects: 1. The cutting force is reduced due to sufficient supply of the solid lubricant to the cutter surface; 2. The adhesion of the chips to the cutter surface is reduced and cutting edges are avoided, because the annular boss part of the concave-convex complex morphology separates the cutter from the chips forcibly; 3. The machining accuracy and quality of the workpiece surface are improved, due to the reduction of chip adhesion; 4. Compared with the existing scheme of combination of cavities or grooves with a solid lubricant in the prior art, a surface with a concave-convex complex morphology combined with a solid lubricant has a superior carrying and bearing property and is more suitable for higher cutting speed and greater cutting depth; 5. In the cutting process with the cutter, the convex dam blocks the solid lubricant from further scattering over the rake face and forces a part of the solid lubricant to flow back to the array of concave-convex complex morphologies, so that the solid lubricant is subjected to cyclic utilization, and the effective retention time of the solid lubricant is increased; 6. After the solid lubricant is filled to the top of the annular bosses, the annular bosses play a function of a scale on the cutter surface, so that the annular bosses define the thickness of partial solid lubricant layer removed with a piece of abrasive paper and finally control the filling amount of the solid lubricant; compared with a scheme of filling a solid lubricant into a simple cavity morphology, the filled volume and quality of the solid lubricant are greatly improved, and the filling process is simplified; 7. Compared with an array composed of different morphologies that needs different processing technologies, the array of concave-convex complex morphologies in the present invention is formed by means of pulsed laser in one step; thus, the manufacturing process is simplified, good solid lubricant storage and anti-adhesion effects are attained at the same time, and the frictional characteristic and performance of the cutter are improved.

In the figures: 1—pit; 2—annular boss; 3—diameter of pit; 4—depth of pit; 5—width of boss; 6—height of boss; 7—solid lubricant; 10—cutter; 11—workpiece; 12—chip; 13—convex dam; 14—solid lubricant film.

DETAILED DESCRIPTION

Hereunder the embodiments of the present invention will be described in detail with reference to the accompanying drawings.

It should be noted: 1. The composition of the solid lubricant has no influence on the implementation of the present invention; therefore, the type of the solid lubricant is not a key point in the present invention, and other types and formulations of solid lubricants are within the protection scope of the present invention; 2. Since the working principles of different metal cutters are similar to each other, the present invention is applicable to various metal cutters, not limited to external turning tools; 3. Though the morphologies obtained by applying laser beams with the same parameters to different cutter materials may be different in dimensions from each other, a design morphology still can be obtained by controlling key parameters (output power, pulse width, and defocusing amount); therefore, the present invention is applicable to all metal cutter materials; 4. To facilitate understanding, only a processing scheme of rake face is illustrated in the accompanying drawings of the examples; however, it should not be deemed that the method provided in the present invention is only applicable to the rake face of a cutter.

Figure 1:
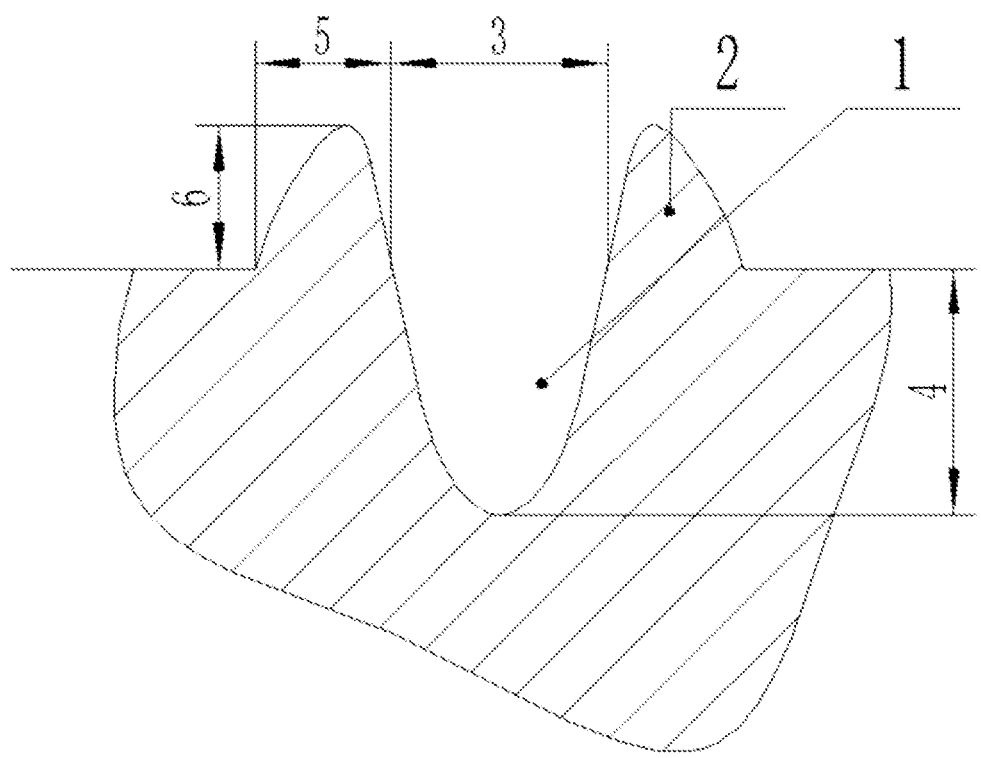
FIG. 1 is a cross sectional schematic view of the concave-convex complex morphology.
Figure 2:
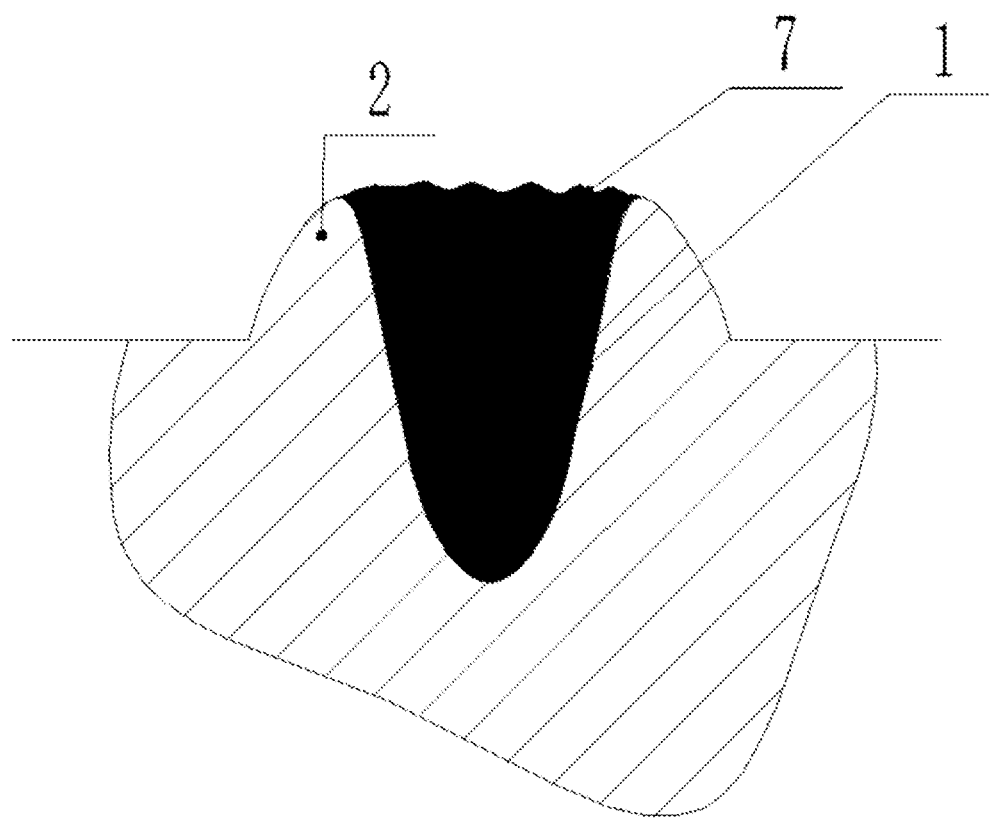
FIG. 2 is a cross sectional schematic view of the concave-convex complex morphology filled with a solid lubricant.
Figure 3:
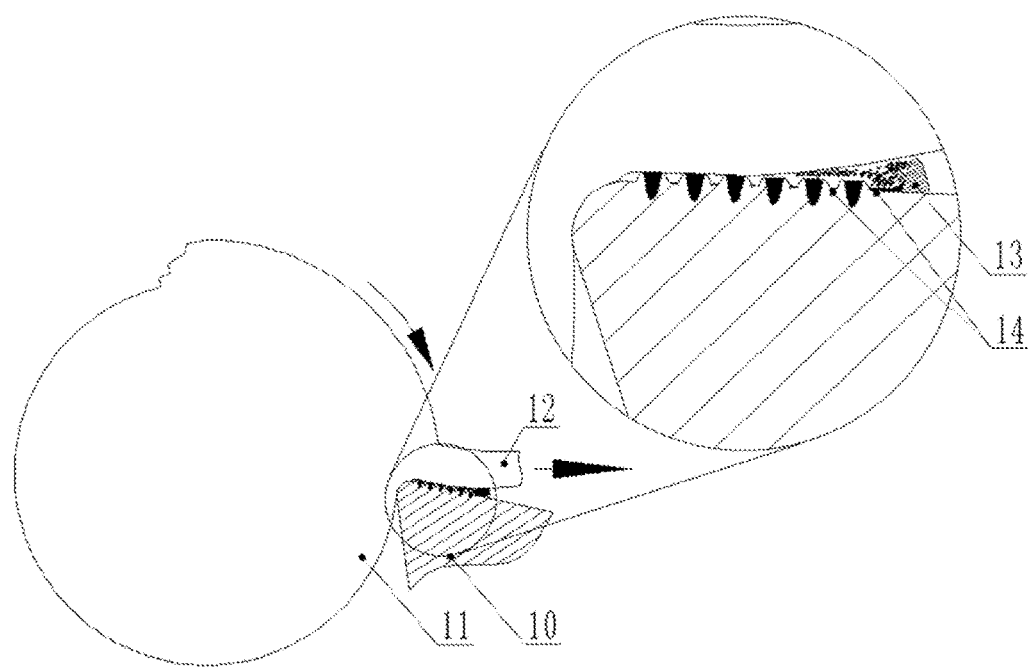
FIG. 3 is a schematic diagram of the working principle of the surface morphology in a cutting process.

Hereunder the FIGS. 1, 2 and 3 will be described respectively.

Example 1

In this example, the cutter 10 is a cemented carbide alloy external turning tool, and the material to be cut is an aluminum alloy material.

An optical fiber laser that outputs infrared laser in Gaussian distribution is selected.

The solid lubricant is obtained by mixing 90 wt. % $MoS_2$ and 10 wt. % polyimide powder.

The technical features of the present invention are implemented through the following steps:

Step A, surface pre-processing of cutter 10; the surface of the cutter 10 to be worked out with a texture is polished, so that the roughness Ra of the surface is lower than 0.3 μm.

Step B, determination of complex texture region and density. In this example, the texture region includes a region where the rake face of the cutter is in contact with chips and a region where the flank face of the cutter is in contact with the workpiece. The area percentage of the concave-convex complex texture is 20%.

Step C, texturing of concave-convex complex morphology on the metal cutter 10. The parameters of the laser include: 40-70 W output power, 1 mm defocusing amount, and 1.1 ms pulse width. Each concave-convex complex morphology is obtained by processing with a single laser pulse that has said parameters. After the action of a laser pulse on the cutter surface is completed, the irradiation position of the laser is changed, and the subsequent morphologies are processed in the same way.

The concave-convex complex morphology is characterized in that a pit 1 is formed at the center of the morphology and an annular boss 2 is formed around the pit 1; the diameter 3 of the pit is 70 μm, and the depth 4 of the pit is 20 μm; the width 5 of the annular boss is 30 μm, and the error of the above dimensions is ±5 μm. The height 6 of the annular boss is 4-6 μm. The number of the convex dams is greater than or equal to 1; in case of two or more convex dams, the convex dams are arranged parallel to each other.

Step D, processing of a convex dam 13 on the metal cutter. The parameters of the laser are: 70-90 W output power, 0.1 m/min scanning speed, and 1 KHz pulse frequency. The convex dam 13 is formed by continuous laser beam scanning.

The convex dam 13 is a band-shaped protrusion 2 in certain height, and it is perpendicular to the chip outflow direction, has a height of 400 μm and a width of 500 μm.

In the cutting process of the cutter 10, the convex dam 13 blocks the solid lubricant 7 from further scattering over the rake face and forces a part of the solid lubricant 7 to flow back to the array of concave-convex complex morphologies, so that the solid lubricant 7 is subjected to cyclic utilization.

Step E, solid lubricant filling and sintering; A solid lubricant 7 is filled into the pits 1 of the concave-convex complex morphology; the solid lubricant 7 is cured in the pits 1 through a sintering process; the curing temperature in the sintering process is 230° C., and the curing time is 30 min.; after the sintering process is completed, excessive solid lubricant 7 on the surface is removed by sanding with a piece of abrasive paper.

The diameter 3 of the pit is the diameter of the maximum inscribed circle of a shape enclosed by the boundaries of the pit 1. The depth 4 of the pit is the distance from the deepest point of the pit 1 morphology to the surface of the base material. The height 6 of the annular boss is the distance from the highest point of the annular boss 2 to the surface of the base material. The width 5 of the annular boss is the average of radial thickness of the annular boss 2.

The cutter 10 with a concave-convex complex texture in combination with a solid lubricant is applicable to a dry cutting condition. In the cutting process, the solid lubricant 7 is released slowly from the surface texture and forms a solid lubricant film 14, so that the friction between the cutter 10 and the chips 12 is reduced; the annular bosses 2 separate the cutter 10 from the chips 12, to avoid adhesion of the chips 12 to the surface of the cutter 10; the following effect is obtained finally: the cutting force, cutting temperature, and adhesive wear are greatly reduced, and the cutting quality is improved.

Example 2

A difference of the example 2 from the example 1 lies in the filling method in the step E.

In the example 2, the method for filling the solid lubricant 7 in the step E is as follows: the solid lubricant 7 is filled into the cutter surface with the concave-convex complex texture till the final filling height of the solid lubricant 7 is greater than the height 6 of the annular bosses, and the space outside of the concave-convex complex morphology is filled, so that the solid lubricant 7 covers all morphology features in the texture region.

Then, the filled surface is leveled with a piece of abrasive paper, and the solid lubricant 7 is removed partially, such that the thickness of the solid lubricant 7 is equal to the height 6 of the annular bosses.

With the above filling method, the volume of solid lubricant 7 carried on the cutter surface is further increased, and the surface supporting ratio is improved. The annular bosses 2 play a function of a scale on the cutter surface, so that the annular bosses 2 define the thickness of the solid lubricant layer 7 partially removed with a piece of abrasive paper and finally control the filling amount of the solid lubricant 7.

Example 3

In this example, the cutter 10 is a cemented carbide alloy external turning tool, and the material to be cut is titanium alloy.

The differences of the example 3 from the examples 1 and 2 lie in the step B and step C.

In the example 3, the area percentage of the concave-convex complex texture is 40% in the step B.

In the example 3, the diameter 3 of the pits is 50 µm and the depth 4 of the pits is 20 µm in the step C; the height 6 of the annular bosses is 4 µm, and the width 5 of the annular bosses is 15 µm.

We claim:

1. A solid-lubricated metal cutter having a cutting blade, comprising:
    a surface texture morphology formed on an outer surface of the metal cutter;
    a solid lubricant filled into the surface texture morphology; and
    a convex dam arranged on the cutter surface on which the surface texture morphology is located at a chip flow side of the surface texture morphology away from a cutting blade.

2. The metal cutter according to claim 1, wherein, the surface texture morphology is a concave-convex complex morphology comprising an array of pits arranged at the center and annular bosses arranged around the pits.

3. The metal cutter according to claim 2, wherein, the diameter of the pits is 50-500 µm and the depth of the pits is 10-100 µm.

4. The metal cutter according to claim 2, wherein, the height of the annular bosses is 1-30 µm and the width of the annular bosses is 5-100 µm.

5. The metal cutter according to claim 2, wherein, the surface texture morphology is at 50-200 µm distance from the cutting blade.

6. The metal cutter according to claim 2, wherein, the solid lubricant is filled into the cutter surface with the concave-convex complex texture to a filling height that the solid lubricant is flush with the top of the annular bosses.

7. The metal cutter according to claim 6, wherein, the convex dam is a band-shaped protrusion and has a height of 50-500 µm and a width of 100-1,000 µm.

8. The metal cutter according to claim 7, wherein, the convex dam is perpendicular to a chip outflow direction.

9. The metal cutter according to claim 7, further comprising at least one additional convex dam arranged parallel to the convex dam.

10. The metal cutter according to claim 1, wherein, the surface texture morphology region comprises a portion where the cutter is in contact with chips and a portion where the cutter is in contact with a workpiece.

11. The metal cutter according to claim 10, wherein, the area percentage of the surface texture morphology is 10%-40%.

12. The metal cutter according to claim 10, wherein, the area percentage of the surface texture morphology is 15%-25%, and the workpiece is an aluminum alloy workpiece.

13. The metal cutter according to claim 10, wherein, the area percentage of the surface texture morphology is 35%-45%, and the workpiece is a titanium alloy workpiece.

14. The metal cutter according to claim 1, wherein, the solid lubricant is a composite material comprising one or two of molybdenum disulfide, graphite, tetraboron nitride, or silver solid lubricants.

15. A method of manufacturing a solid-lubricated metal cutter having a cutting blade, the method comprising:
    forming a surface texture morphology on the metal cutter;
    forming a convex dam on the cutter surface on which the surface texture morphology is located at a chip flow side;
    filling a solid lubricant into the surface texture morphology; and
    fixing the solid lubricant in the micro-texture morphology by a sintering process.

16. The method according to claim 15, wherein, the surface texture morphology is processed with a laser beam to obtain a concave-convex complex morphology and a morphology of convex dam,
    wherein the laser is at least one of a $CO_2$ laser, lamp pumping YAG laser, diode pumping YAG laser, or optical fiber laser, and
    wherein the operating parameters of the laser comprise: 40-1,000 W output power;
    ±2 mm defocusing amount; and
    0.01-500 ms pulse width.

17. The method according to claim 16, wherein, the method for processing the concave-convex complex morphology further comprises:
    processing the cutter surface with a single laser pulse to obtain a morphology that has a pit at the center and an annular boss around the pit;
    changing the irradiation position of the laser on the cutter surface to an adjacent morphology point;
    processing with a single laser pulse; and
    repeating the operations to form an array of concave-convex complex morphologies.

18. The method according to claim 17, wherein, the method for filling the solid lubricant into the surface texture morphology comprises:
    filling the solid lubricant into the pits of the concave-convex complex morphology until the final filling height of the solid lubricant is equal to the height of the annular bosses.

19. The method according to claim 17, wherein, the method for filling the solid lubricant into the surface texture morphology comprises:

filling the solid lubricant into the pits of the concave-convex complex morphology until the final filling height of the solid lubricant is greater than the height of the annular bosses;

filling the spaces outside of the pits of the concave-convex complex morphology so that the solid lubricant covers all morphologies in the surface texture morphology region; and leveling the filled surface with a piece of abrasive paper, till the thickness of the solid lubricant layer is equal to the height of the annular bosses.

20. The method according to claim 16, wherein, the convex dam is formed by continuous laser beam scanning.

21. The method according to claim 15, wherein, a curing temperature of the sintering process is 200-600° C., and the curing time is 10-60 minutes.

22. The method according to claim 15, wherein, after the sintering process, excessive solid lubricant on the surface is removed by sanding with a piece of abrasive paper until the height of the solid lubricant is equal to the height of the annular bosses.

23. The method according to claim 15, wherein, the surface of the cutter is pre-processed before the surface texture is formed on the metal cutter and the surface of the metal cutter is polished so that the roughness Ra of the surface of the metal cutter is lower than 0.3 μm.

* * * * *